United States Patent [19]

Pavlath

[11] Patent Number: 4,991,926

[45] Date of Patent: Feb. 12, 1991

[54] INTEGRATED OPTICS DECORRELATOR

[75] Inventor: George A. Pavlath, Ventura County, Calif.

[73] Assignee: Litton Systems, Inc., Beverly Hills, Calif.

[21] Appl. No.: 505,968

[22] Filed: Apr. 6, 1990

[51] Int. Cl.$^5$ .............................................. G02B 6/26
[52] U.S. Cl. .............................. 350/96.15; 350/96.12; 350/96.13; 356/350
[58] Field of Search ............... 350/96.12, 96.13, 96.14, 350/96.15; 356/350

[56] References Cited

U.S. PATENT DOCUMENTS

| | | | |
|---|---|---|---|
| 4,468,085 | 8/1984 | Papuchon et al. | 350/96.14 |
| 4,549,806 | 10/1985 | Martin et al. | 356/350 |
| 4,786,129 | 11/1988 | Webb | 350/96.15 |
| 4,882,775 | 11/1989 | Coleman | 350/96.14 X |
| 4,927,223 | 5/1990 | Pocholle et al. | 350/96.12 X |
| 4,938,594 | 7/1990 | Pavlath | 350/96.12 X |

OTHER PUBLICATIONS

Arditty et al., "Test Results of an Integrated Fiber Optics Brass Board", pp. 147–150.
TI-Diffused LiNbO3 Branched Waveguide Modulators; Performance and Design.

Primary Examiner—John D. Lee
Assistant Examiner—Phan T. Heartney
Attorney, Agent, or Firm—James F. Kirk

[57] ABSTRACT

An integrated optics decorrelator device with a first integrated optics junction. The first optics junction has two input paths and at least one output path formed as a Y-shaped assembly of two mono-modal optical waveguides joined at a node with a central multi-modal optical waveguide. The central multi-modal optical waveguide segment has an output end. A second integrated optics junction has two output paths formed as a Y-shaped assembly of two output mono-modal optical waveguides joined at the output end of the central multi-modal optical waveguide segment. The first integrated optics junction and the second integrated optics junction are formed inside a refractive medium having a lower refractive index than the refractive index of the waveguides. The central multi-modal optical waveguide segment has an elongated multi-modal waveguide for decorrelating symmetric mode light passing through the central multi-modal optical waveguide with respect to anti-symmetric mode light passing through the substrate to the second integrated optics junction coupled to a tapered waveguide segment.

10 Claims, 5 Drawing Sheets

INTEGRATED OPTICS DECORRELATOR

FIELD OF THE INVENTION

This invention relates to the field of optical instruments such as interferometers and fiber optic gyros, and more particularly to the field of optical components such as integrated optical couplers for use in integrated optical circuits.

RELATED ART

Fiber optic gyros typically use an optical coupler for the purpose of coupling light beams into a fiber optic coil or for directing light to the coil while splitting off and directing interference pattern signals to a detector. Conventional optical couplers are made in accordance with processes such as those characterized in U.S. Pat. No. 4,738,511 issuing to John Fling on Apr. 9, 1988 for a Molecular Bonded Fiber Optic Coupler & Method of Fabrication having a common assignee with the present invention. Couplers of that type produce a predictable and reliable component from individual fibers by using a multi-step labor intensive process.

U.S. Application Ser. No. 07/257,749 filed Oct. 14, 1988 now. U.S. Pat. No. 4,938,594 for an Anti-Symmetric Mode Filter having a common inventor and assignee is related to this invention. The central waveguide segment does not show or suggest a means for decorrelating symmetric and antisymmetric mode light passing through the central waveguide segment.

U.S. Pat. No. 4,468,085 issued to Michel Papuchon et al on Aug. 28, 1984 for a "Hybrid Optical Junction and Its Use In A Loop Interferometer". FIG. 2 of the Papuchon reference shows a pair of integrated optical junctions formed in a substrate. The waveguide segments are formed in a substrate of feroelectric material such as lithium niobate by masking the surface of the substrate and by depositing a material in the substrate such as titanium to form the waveguides. The integrated coupler of Papuchon is reproducible in large numbers without the labor intensive steps necessary for the coupler of Fling.

The Papuchon reference is excited by launching light from a light source, such as a light emitting diode, into a single optical input. The light entering the input excites equal amounts of light in the symmetric mode and in the anti-symmetric mode within the coupled modes of adjacent waveguides. Antisymmetric mode light is radiated into the substrate in which the waveguide segments are formed at the first junction. Small portions of the anti-symmetric mode light radiated into the substrate, pass through the substrate and recouple back into the wave guide segments after the second junction to cause very large bias errors in symmetric mode light passing through the device.

In a paper by T. R. Ranganath titled "Ti-Diffused LiNbO₃ Branched-Waveguide Modulators: Performance and Design" published in the IEEE JOURNAL OF QUANTUM ELECTRONICS, VOL. QE-13, NO. 4, pages 290-295 dated APRIL 1977, at page 294, the author discusses the importance of a single mode waveguides and the combining functions of a fork. The author comments at page 294 that "It has been proved from very general symmetry considerations that no 3-port junction can be exactly matched. The importance of this result is in identifying that our dielectric forks have 3 ports which can propagate bound modes and one extra port connected with the unbound radiation modes. Therefore, the presence of the fourth port accounts for the scattering losses, which can be reduced by careful design, but can never be eliminated".

In the above referenced article by Ranganath, the author comments that any single-mode device making use of horn regions to feed light into the structure will encounter scattering losses and advises that "ways have to be found to take care of this scattered light". The paper does not show how to prevent the scattered losses from introducing bias errors by influencing optical signals elsewhere in the substrate.

U. S. Pat. No. 4,549,806 for A Method and Apparatus Measuring Absolute Rotation, filed Sept. 30, 1982 and issuing Oct. 29, 1985 to P. Martin and K. Petermann discusses the problem of decorrelating two polarization modes but does not teach or suggest the use of a decorrelator waveguide segment within an integrated optical coupler.

SUMMARY OF THE INVENTION

It is a first object of the invention to provide an integrated optics decorrelator device that provides the function of an integrated optical coupler capable of being manufactured in high volume with substantially identical properties.

A second object of the invention is to receive light at a waveguide input of the integrated optics decorrelator device. The waveguide input and associated waveguides segments that comprise the device are formed on a substrate. The light that is received excites both symmetrical and asymmetrical modes of light in the input waveguide. The symmetrical mode light passes through the input waveguide and splits into substantially equal parts, each equal part being coupled to an output wave guide segment. The invention integrated optics decorrelator device decorrelates the anti-symmetric mode with respect to the symmetrical mode light which recouples into output waveguide segments through which the symmetrical mode light is passing.

These objects are realized in a preferred embodiment of the invention integrated optics decorrelator device having a first integrated optics junction having two input paths and at least one output path formed as a Y-shaped assembly of two monomodal optical waveguides joined at a node with a central multimodal optical waveguide segment having an output end.

A second integrated optics junction has two output paths and at least one input path formed as a Y-shaped assembly of two output mono-modal optical waveguides joined at a node with a central mono-modal optical waveguide segment. The central mono-modal optical waveguide segment has an input end.

The central multi-modal optical waveguide segment output end is coupled to the central mono-modal optical waveguide segment input end. The first integrated optics junction and the second optics junction are formed inside a refractive medium having a lower refractive index than the refractive index of the waveguides and are separated by an tapered adiabatic segment interposed between the central multi-modal optical waveguide segment output end and the central mono-modal optical waveguide segment input end.

PREFERRED EMBODIMENT

The paper by T. R. Ranganath titled "Ti-Diffused LiNbO$_3$ Branched-Waveguide Modulators: Performance and Design" published in the IEEE JOURNAL OF QUANTUM ELECTRONICS, VOL. QE-13, NO. 4, pages 290-295 dated APRIL 1977 is incorporated herein by reference for its information on single and multi-mode waveguide design and the design of symmetric fork guide structures in optical integrated circuits.

Figure 1:
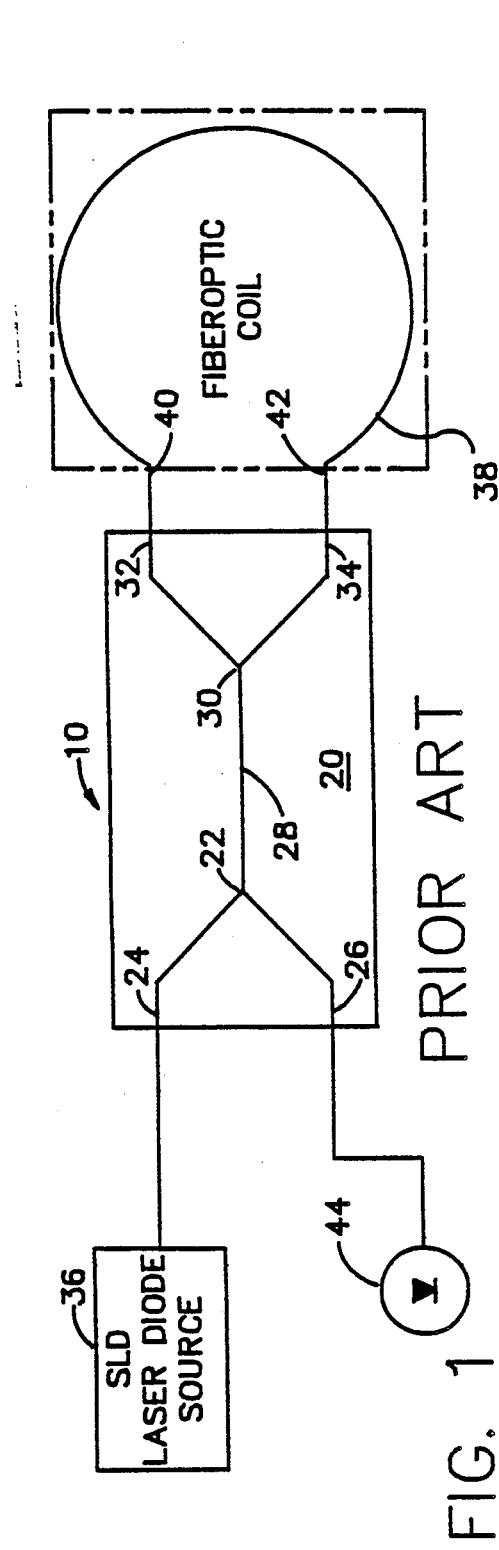
FIG. 1 is a schematic of an optical circuit using a PRIOR ART optical coupler to supply light to a fiber optic ring.

FIG. 1 is a schematic representation of a PRIOR ART optical circuit using an integrated optics coupler device 10 formed on a substrate 20. The integrated optics coupler device 10 has a first integrated optics junction 22 with two input paths 24, 26 and at least one output path formed as a Y-shaped assembly of two mono-modal optical waveguides joined at a first integrated optics junction 22 with a central mono-modal optical waveguide segment 28.

The central mono-modal optical waveguide segment 28 has an output end at a second integrated optics junction 30. The second integrated optics junction 30 has first and second output paths 32, 34 formed as a Y-shaped assembly of two output monomodal optical waveguides joined at the output end of the central mono-modal optical waveguide segment 28.

The optical coupler 10 is coupled to receive light from a source such as a superluminescent diode (SLD) 36 through waveguide segment 24. The light from the SLD source 36 passes through waveguide 24, through the mono-modal waveguide 28, to second integrated optics junction 30 of waveguides 32 and 34. The light is split at junction 30 to travel through waveguides 32 and 34 to supply clockwise (CW) and counterclockwise (CCW) light beams having nominally equal intensities, into each end of the multi-turn fiber-optic coil 38 at entrance ports 40 and 42 respectively.

Figure 2:
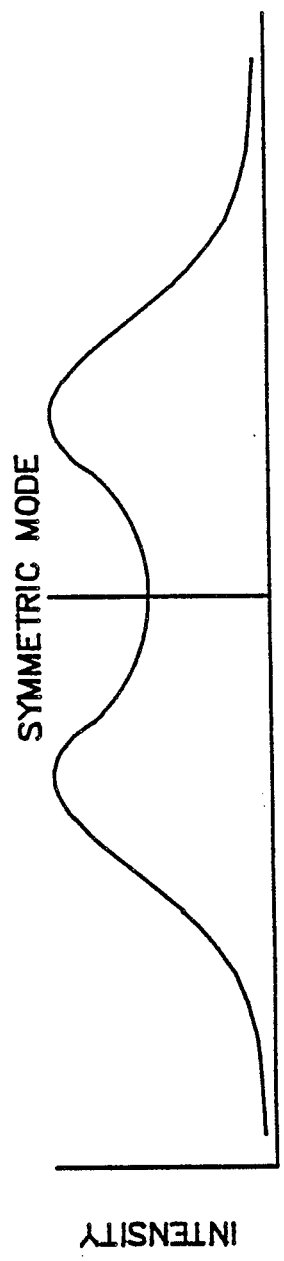
FIG. 2 is a schematic graphical representation of electric intensity as a function of distance measured across the cross section of an optical waveguide for symmetrical mode optical energy moving through the wave guide.
Figure 3:
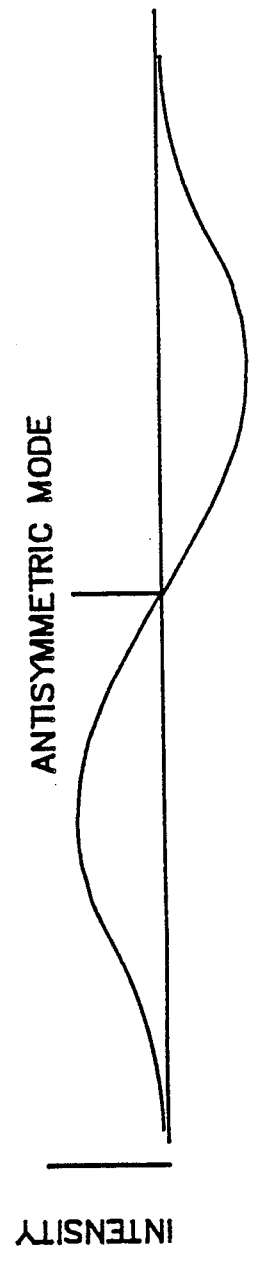
FIG. 3 is a schematic graphical representation of electric intensity as a function of distance measured across the cross section of an optical waveguide for anti-symmetrical mode optical energy moving through the wave guide.

Light received and carried by waveguide segment 24 excites equal amounts of symmetric mode and anti-symmetric mode light as coupled modes within waveguides 24 and 26. FIG. 2 schematically depicts the peak electric field intensity at points across a cross-section of the two mono-mode wave guides 24, 26 for symmetric mode light. FIG. 3 schematically depicts the intensity of anti-symmetric mode across a cross-section of the same two-mode waveguide.

As the light in waveguide 24 reaches the first integrated optics junction 22, light in the symmetric mode propagates though mono-modal waveguide 28 while light in the anti-symmetric mode is radiated into the substrate 20. As the symmetric mode light in mono-modal waveguide 28 reaches the second integrated optics junction 30, the energy splits into separate beams which move through waveguides 32 and 34.

The problem PRIOR ART coupler 10 permits some of the anti-symmetric mode light that passes into the substrate 20 to recouple back into waveguides 32 and 34. The anti-symmetric mode light that recouples into waveguides 32 and 34 is generally out of phase with the symmetric mode light that moved directly through mono-modal waveguide 28. The light that moves through the substrate 20 takes a longer path down into the substrate 20 that is a multi-path route. An arbitrary environmentally dependent phase shift results between the symmetric mode light reaching waveguides 32 and 34 and the anti-symmetric mode light that depends on the exact details of the path traveled as the signal reenters wave guides 32 and 34 to add to the original symmetric mode signal. The resulting composite CW and CCW signals causes a bias error in the sensed interference signal at detector 44.

Figure 4:
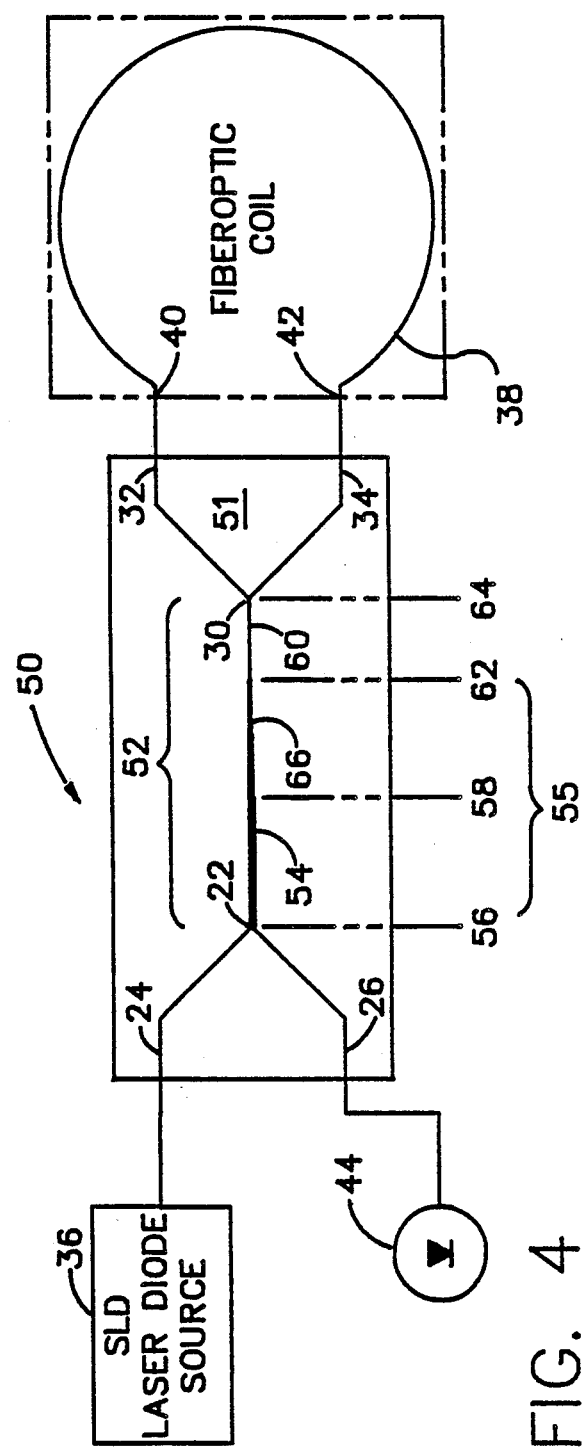
FIG. 4 is a schematic of an optical circuit using a the invention integrated optical decorrelator to supply light to a fiber optic ring.
Figure 5:
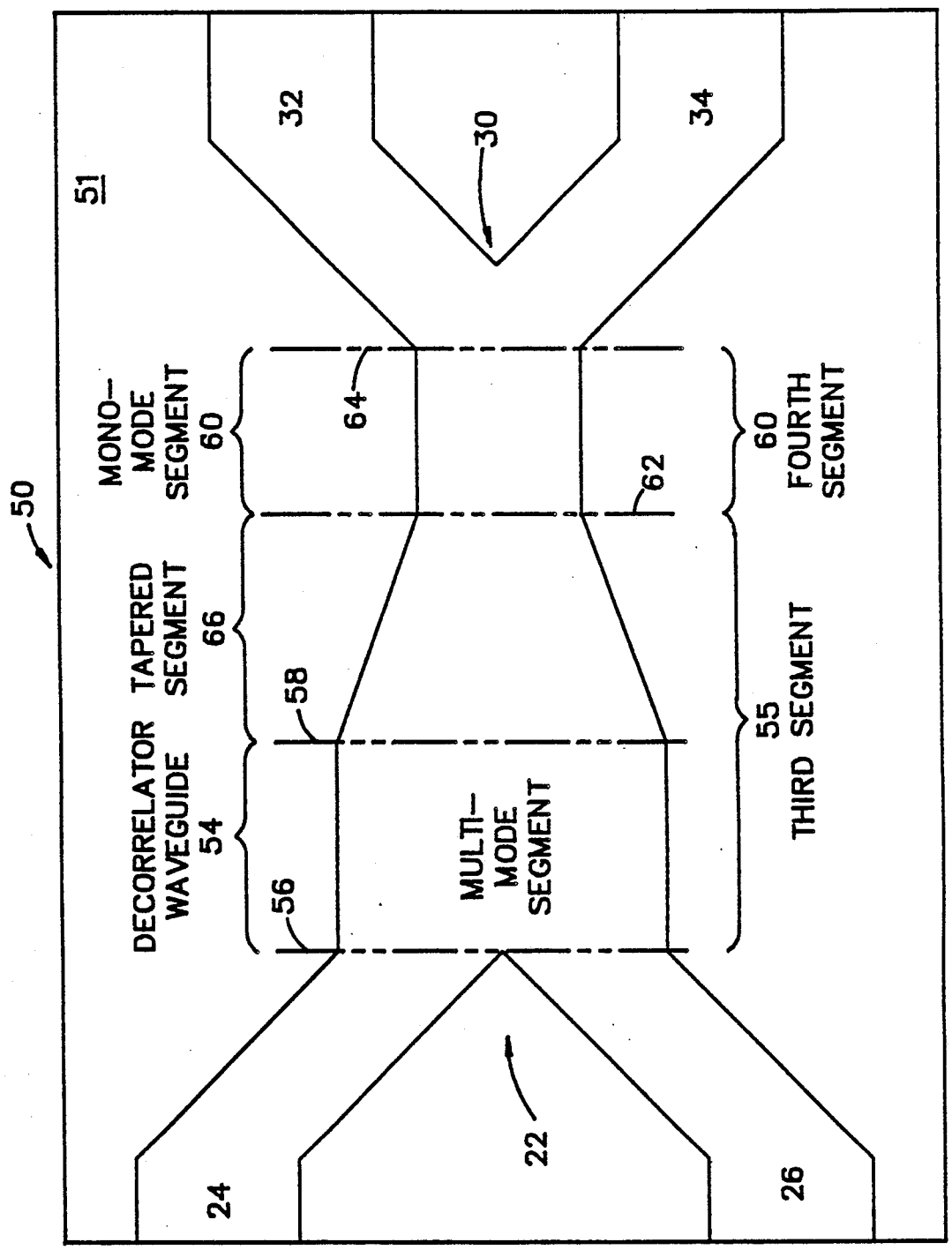
FIG. 5 is a schematic plan view of the substrate of the invention integrated optics decorrelator showing the diffusion pattern of the waveguide.

FIG. 4 is a schematic diagram of the optical circuit of FIG. 1 in which the optical coupler 10 is replaced by the invention integrated optics decorrelator 50. The invention integrated optics decorrelator 50 differs from the optical coupler of FIG. 1 by the substitution of a central multi-modal optical waveguide 52 for at least a portion of the mono-modal wave guide 28. The central multi-modal optical waveguide 52 represents a means for decorrelating symmetric mode light with respect to anti-symmetric mode light as the respective beams pass from the first integrated optics junction 22 through the central multi-modal optical waveguide 52 to the second integrated optics junction 30. As shown in FIGS. 4 and 5, the central multimodal optical waveguide 52 has a multi-mode segment 54 with an input end 56 and an output end 62. A mono-modal waveguide 60 has an input end at 62 and an output end at 64. In the preferred embodiment, a tapered segment 66 is interposed between the multimodal waveguide output end 58 and a mono-modal waveguide input end 62.

The multi-modal waveguide input end 56 is connected to the first integrated optics junction 22 and the mono-modal waveguide output end 64 is connected to the second integrated optics junction 30. As anti-symmetric mode energy moves through the tapered segment 58, it is forced to radiate into the substrate 58. Symmetric mode light passes through the tapered segment without radiation. The length of the tapered segment is adjusted to be adiabatic. The length is typically in excess of 20 times the width and can be increased to lengths approaching 5 mm.

FIG. 5 is a plan view of the substrate 52 schematically showing the areas on the substrate occupied by the exposed surfaces of imbedded optical waveguide regions. In the preferred embodiment, the substrate is typically formed from Y-cut cut LiNbO$_3$, a refractive medium having a lower refractive index than the refractive index of the waveguides. The first integrated optics junction 22 and the second integrated optics junction 30 are formed inside the substrate 51.

The invention integrated optics decorrelator 50 is fabricated using conventional processing steps, such as the steps characterized in the above referenced paper by T. R. Ranganath titled "Ti-Diffused LiNbO$_3$ Branched-Waveguide Modulators: Performance and Design". A typical series of steps would begin with coating a poled and polished Y-cut LiNbO$_3$ crystal having dimensions 1, 4, 32 mm (along Y, Z, X axes) with a positive photoresist, such as (AZ 1350J) and exposing the resist through an appropriate mask. The width of the guides is determined by the wavelength of the light source and the number of modes to be supported. The multi-modal guides are approximately double the width of the monomodal guides. After development of the photoresist, a thin layer of Titanium approximately 10 nm, is sputtered onto the exposed surfaces of the substrate. The photoresist layer is then stripped in acetone, leaving the desired Ti pattern. Diffusion of the Ti into the substrate is then carried out at an oven temperature of approximately 980° C. for 4.5 h in an argon environment. The process results in an integrated optics decorrelator 50 with transverse mode guides in the depth direction.

Alternate embodiments of the process can use dopants such as Ti, H, He, Zn for the fabrication of waveguides. The dopant raises the index of refraction of the channel and forms a waveguide with high transmissibility in comparison to the substrate. Ti and Zn are implanted by thermal diffusion and Hydrogen H is implanted by proton exchange in an acid bath. Helium He is implanted with an accelerator. The dopants are implanted using conventional masking techniques, such as that characterized above, to define the perimeters of the waveguide segments. Temperature, concentration and time are adjusted to control the concentration of the implants.

The function performed by the central multi-modal optical waveguide 52 is similar to that encountered in the field of spread spectrum communications. If a signal is transmitted from an antenna, and if the signal is split and one portion of the radiated signal goes directly to the receiver and a second portion travels to a mountain and then returns to the receiver, and if the spectrum is broad enough and if the delay between the reflected path and the direct path is large enough, then the correlation of the first signal with respect to the second signal at the receiver will approach zero. As the two signals become correlated, as in the case of reflected television signals, a ghost signal is perceived in the video image produced by the received signal.

In the invention optical decorrelator, the light source is broad band light or spread spectrum light which insures a broad spectrum. Two paths are traveled. The first path is traveled by the symmetrical mode energy that remains within the waveguide and the second path is traveled by the anti-symmetric mode energy that is launched into the substrate.

The central multi-modal optical waveguide 52 is designed to maximize the transit time difference between the symmetric and anti-symmetric modal light moving through the central multi-modal optical waveguide. The maximization of the time difference is achieved by designing the geometry of the waveguide to achieve the maximum velocity difference. Each of the starting signals, the symmetric mode signal within the central multi-modal optical waveguide and the anti-symmetric mode signal within the waveguide, are spread spectrum signals that are correlated at the beginning. As the signals are launched at node 22, they move down the multi-mode segment 54 and one will be delayed with respect to the other as they continue to move along the segment. The multi-mode segment 54 is designed to have a length that is long enough to introduce enough delay time to allow the slower beam to be delayed by an interval that is sufficient to exceed the decorrelation time of the light modes moving therein. As the symmetric and anti-symmetric light move to the multi-mode output end 58, the modes will not interfere with each other. For the best mode of operation, the length of the multi-mode segment 54 or decorrelation segment should be at least two decorrelation times in length.

The length of the multi-mode segment is determined by referring to the following considerations. Using the letter L or lambda to represent the center wavelength, and dL to represent the full width at half maximum of the light spectrum, the coherence length (Lcoh) for light is usually defined as:

$$Lcoh = (L) * 2/(\pi * dL)$$

The factor $\pi$ in the denominator is used to determine the line shape. A factor of pi is used for a Lorentzian shaped bandwidth, or line shape, and a different factor is used for a Gaussian line shape. The dL term is the full width or bandwidth at half maximum power and L is the center frequency wavelength. The equation is similar to the expression used to establish the Q of an oscillator. The wavelength of the light L is in the range of 800 to 1500 nanometers with the more typical applications being at 1500 nanometers. The delta lambda or dL term is typically in the range of 10 to 40 nanometers. Using the ranges thus described, the coherence length Lcoh is typically in the range of 25 to 150 microns. This value is the minimum theoretical length needed to decorrelate the symmetric and antisymmetric modes. In practice a design coherence length of 200 to 250 nanometers is used.

As the wavefronts propagate along segment 6, the difference in the distance delta increases as a function of the difference of the velocities of the two wavefronts. The distance delta is calculated as a function of the speed of light c, and the index of refraction of the media n as in equation 2 below:

$$delta = ((v - v2) * D)/(c/n)$$

The index of refraction for lithium niobate is about 2.2. The speed of light is about 300,000 meters per second. The difference in the velocities is typically about 1 percent. D is the length of the multi-mode segment 54.

FIG. 5 depicts an expanded view of multi-mode segment 54 followed by the tapered segment 66. The combination is of a segment of uniform cross section followed by a tapered segment 66 that is an adiabatic taper to match the large cross section of the multi-mode waveguide 54 to the smaller cross section of monomode segment 60. An alternate, and less efficient embodiment is formed by omitting the tapered segment and allowing the cross section of segment 7 to extend to and terminate abruptly at the input end of segment 60.

The taper is not critical to the decorrelation process but operates to reduce the loss of light into the substrate. An abrupt termination might produce a loss of 3 db or more. A properly designed tapered segment 66 can reduce the loss of light to about a 0.1 db. The taper length is typically 1 to 2 millimeters. The tapered angle of the surfaces are typically less than 5 degrees. The length of multi-mode segment 54 is typically 10 millimeters. In a typical design, segment 60 would be 3 microns wide and segment 54 would be 4 to 5 microns wide.

The symmetric mode continues to propagate from segment 54 to segment 66 to waveguide 60. The anti-symmetric mode can not propagate beyond the tapered segment 66. It therefore passes into the substrate. As the symmetric mode light reaches node 30, some of the anti-symmetric mode light couples back into the signal again through an undefined path or multipath. However, since the anti-symmetric mode was decorrelated as it reached the output end 58 of multi-mode segment 54, it is still decorrelated as it couples back into the optical circuit at node 30 and into segments 32 and 34. The anti-symmetric mode light thus coupled does not induce a phase error at these locations because there is no correlation and that greatly reduces the bias error in the output signal of the optical circuit at detector 44.

Optical couplers of the type characterized in connection with the circuit and comments relating to FIG. 1 have been fabricated and tested in a fiber optic gyroscope optical circuit. The optical coupler tested produced bias errors in the order of 500 to 1000 degrees per hour as a result of correlated energy from the anti-symmetric mode coupling back into segments 32 and 34. Coupling back can be reduced by increasing the length of segment 28 with a corresponding reduction in bias error; however, the chip would have to be made impractically long to achieve the low coupling required for a navigational gyro.

By incorporating the multi-mode segment 54 or decorrelation segment, with a length sufficient to achieve 2 or three decorrelation lengths, the symmetric and anti-symmetric modes are decorrelated by more than 99% resulting a reduction in bias error by a factor of at least four orders of magnitude. An added advantage is that the present invention couples the function of an optical coupler with that of a decorrelator with all of the components on one chip increasing repeatability and reducing cost.

Figure 8:
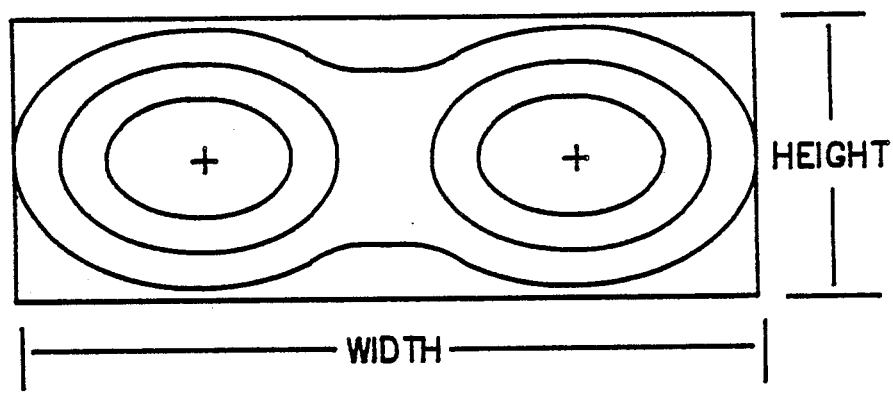
FIG. 8 is a schematic graphical representation of electric field intensity as a function of distance measured across the cross section of an optical waveguide for dual mode optical energy moving through the wave guide.

FIG. 8 schematically shows the integrated optics decorrelator chip in a perspective view. The regions that are diffused with Titanium are shown bordered in phantom.

The spatial mode decorrelator of FIGS. 4 and 5 is alternately characterized as having a substrate 51 with first, second, third, fourth, fifth and sixth waveguide segments (24, 26, 55, 60, 32, 34), each waveguide segment having a first and second end. The first waveguide segment has a first-end coupled to the optical input to receive broadband light from the broadband light source 36. The second and third optical wave guide segments (26, 55) have respective first-ends coupled to the first optical waveguide second-end. The third optical waveguide segment second-end 62 is being coupled to the fourth optical waveguide segment first-end. The fourth optical waveguide segment second-end 64 is coupled to the fifth and sixth waveguide segment 32, 34, first-ends. The fifth and sixth optical waveguide segment second-ends are respectively coupled to the first and second inputs 40, 42, of the closed optical path 38.

The third optical waveguide segment is dimensioned to propagate symmetric and anti-symmetric mode beams of the broadband laser light. Each beam is characterized to move with a different velocity. The third optical waveguide having a length sufficient to introduce a delay time between the beams sufficient to exceed the decorrelation time of the respective symmetric and anti-symmetric beams.

Figure 7:
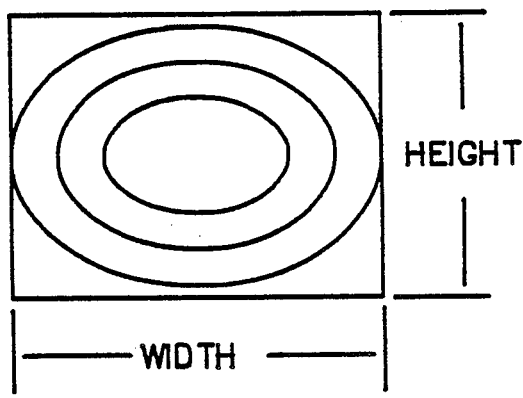
FIG. 7 is a schematic graphical representation of electric field intensity as a function of distance measured across the cross section of an optical waveguide for single mode optical energy moving through the wave guide.

The mono-modal waveguide segment 28 In FIG. 1 and the mono-modal waveguide segment 60 in FIG. 4 are functionally identical since they are both designed to support the transmission of light in a single transverse mode. FIG. 7 is a schematic depiction of lines of constant electric field intensity as they might exist within the cross section of a waveguide. The lines represent the H-Field of a single transverse mode characterized in FIG. 2 as a Gaussian centered field, in the cross section of a waveguide having an X and Y axis normal to the optical axis, or Z axis of the waveguide.

The dot at the center of the mode characterization of FIG. 7 is at the physical center of the waveguide crossection. The field intensity decays away as the distance is increased away from the optical axis toward the walls of the guide. Within the waveguide, the light wave moves in the direction of the optical axis, the Z direction down the waveguide. The wave looks the same coming or going from any reference point in the guide. The fact that the wave is transverse means that the E-field of the wave is oscillating in a plane that is transverse or normal to the Z axis as the plane moves along the Z axis at the speed of light or at a speed compatible with the media of the waveguides.

Figure 6:
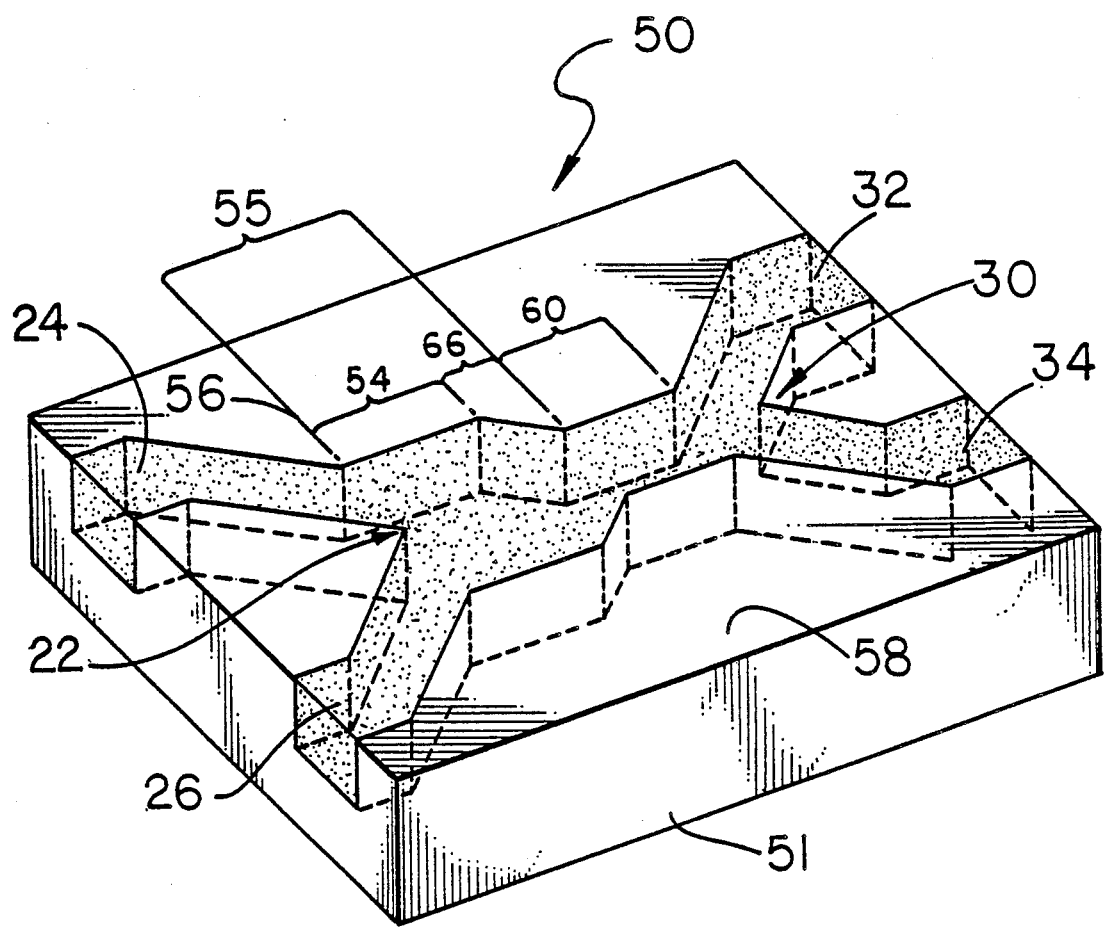
FIG. 6 is a schematic perspective view of the substrate of the invention integrated optics decorrelator showing the diffusion regions of the waveguide within the substrate.

The multi-mode segment 54 of FIGS. 4, 5 and 6 is physically dimensioned to be two-moded in accordance with the mode characterized in FIG. 8. The multi-mode segment 54 supports the symmetric mode. The width of the multi-mode segment 54 is enlarged to support multiple modes including the antisymmetric mode as shown in FIG. 8. The multi-mode segment 54 is typically of uniform cross section for the majority of its length.

I claim:

1. An integrated optics decorrelator device comprising:
   a first integrated optics junction having two input paths and at least one output path formed as a Y-shaped assembly of two mono-modal optical wave-guides joined at a node with a central multi-modal optical waveguide, the central multi-modal optical waveguide segment having an output end;
   a second integrated optics junction having two output paths formed as a Y-shaped assembly of two output mono-modal optical wave-guides joined at the output end of the central multi-modal optical waveguide segment;
   the first integrated optics junction and the second integrated optics junction being formed inside a refractive medium having a lower refractive index than the refractive index of the waveguides;
   the central multi-modal optical waveguide segment being a means for decorrelating symmetric mode light passing through the central multi-modal optical waveguide segment With respect to anti-symmetric mode light passing through the central multi-modal optical waveguide segment.

2. The spatial mode decorrelator of claim 1 wherein the central multi-modal waveguide segment has a multi-mode guide segment length sufficient to decorrelate symmetric mode light passing through the multi-modal waveguide segment with respect to antisymmetric mode light passing through the multi-modal waveguide segment to the output end of the central multi-modal optical waveguide segment.

3. The spatial mode decorrelator of claim 2 wherein the central multi-modal waveguide segment further comprises a mono-modal waveguide segment coupling the multi-mode guide segment to the output end of the central multi-modal optical waveguide segment.

4. The spatial mode decorrelator of claim 2 wherein the central multi-modal waveguide segment further comprises a tapered waveguide segment coupling the multi-mode waveguide segment to the output end of the central multi-modal optical waveguide segment.

5. The spatial mode decorrelator of claim 4 wherein the central multi-modal waveguide segment further comprises a mono-modal waveguide segment coupling the tapered waveguide segment to the output end of the central multi-modal optical waveguide segment.

6. A spatial mode decorrelator coupled to receive broadband laser light from a broadband light source at an optical input and for providing a propagating light ray and a counterpropagating light ray to respective first and second inputs of a closed optical path comprising:
 a substrate having a first, second, third, fourth, fifth and sixth waveguide segments, each waveguide segment having a first and second end; the first waveguide segment having a first end coupled to the optical input to receive broadband light from the broadband light source, the second and third optical wave guide segments having respective first ends coupled to the first optical waveguide second end, the third optical waveguide segment second end being coupled to the fourth optical waveguide segment first end, the fourth optical waveguide segment second end being coupled to the fifth and sixth waveguide segment first ends, the fifth and sixth optical waveguide segment second ends being respectively coupled to the first and second inputs of the closed optical path; the third optical waveguide segment being dimensioned to be multi-modal and to propagate symmetric and anti-symmetric mode beams of the broadband laser light with a different velocities, the third segment optical waveguide having a length sufficient to introduce a delay time between the beams sufficient to exceed the decorrelation time of respective beams.

7. The spatial mode decorrelator of claim 6 wherein the first and second optical waveguide segments are dimensioned to propagate broadband laser light received from the optical input in a single mode.

8. The spatial mode decorrelator of claim 6 wherein the third optical waveguide segment is dimensioned to propagate broadband laser light received from the second end of the first and second optical waveguide segments in a symmetric mode beam and in an anti-symmetric mode beam.

9. The spatial mode decorrelator of claim 6 wherein the fourth optical waveguide segment is dimensioned to propagate broadband laser light received from the second end of the third optical waveguide in a symmetric mode beam; anti-symmetric mode beam light being radiated into the substrate.

10. A spatial mode decorrelator coupled to receive broadband laser light at an optical input and for providing a propagating and a counterpropagating light source to respective first and second inputs of a closed optical path comprising:
 a substrate having an input waveguide segment means for receiving broadband laser light at the optical input, the input segment means being characterized to propagate a symmetric light beam and asymmetric mode light beam to a first optical node;
 a decorrelator waveguide segment means formed in the substrate, the central multi-modal optical waveguide means being responsive to the first optical node for coupling the symmetric light beam and the asymmetric light beam to a second optical node, the symmetric light beam and the asymmetric light beam each being characterized to move with a different velocity, the central multi-modal optical waveguide segment means having an optical waveguide segment length sufficient to introduce a delay time between the symmetric and asymmetric beams sufficient to exceed the decorrelation time of respective beams;
 an output waveguide segment formed as a Y-shaped assembly of two output mono-modal optical waveguides joined at the second optical node for coupling the symmetrical light into a propagating and a counterpropagating light beam, each respective propagating and a counterpropagating light beam being coupled into first and second inputs of a closed optical path.

* * * * *